May 29, 1945.   F. G. COOK   2,377,295
COMBINED PAPER FEEDING AND GUMMING MACHINE FOR LABELS AND THE LIKE
Filed Dec. 22, 1941   9 Sheets-Sheet 3

Inventor,
F. G. Cook
By A. D. Adams
Atty.

May 29, 1945. F. G. COOK 2,377,295
COMBINED PAPER FEEDING AND GUMMING MACHINE FOR LABELS AND THE LIKE
Filed Dec. 22, 1941 9 Sheets-Sheet 5

Inventor,
F. G. Cook
By A. D. Adams Atty.

May 29, 1945.　　　　　F. G. COOK　　　　　2,377,295
COMBINED PAPER FEEDING AND GUMMING MACHINE FOR LABELS AND THE LIKE
Filed Dec. 22, 1941　　　9 Sheets-Sheet 8
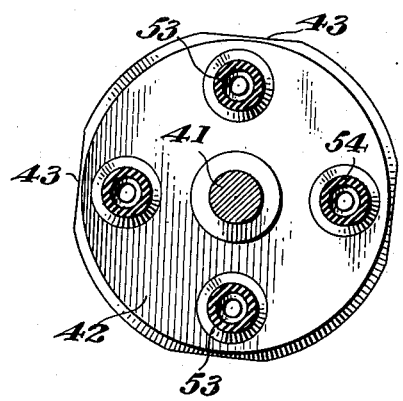
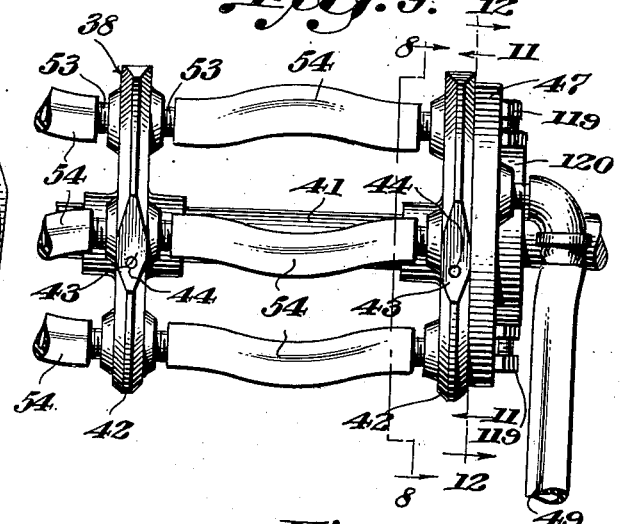
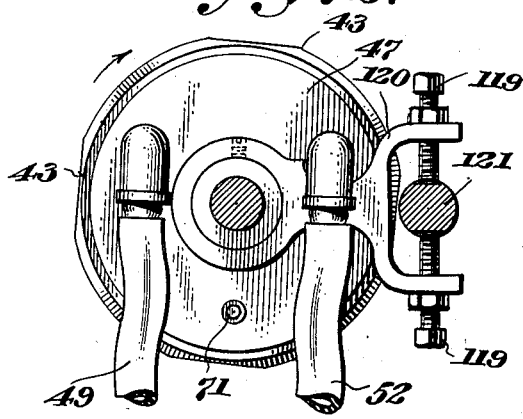
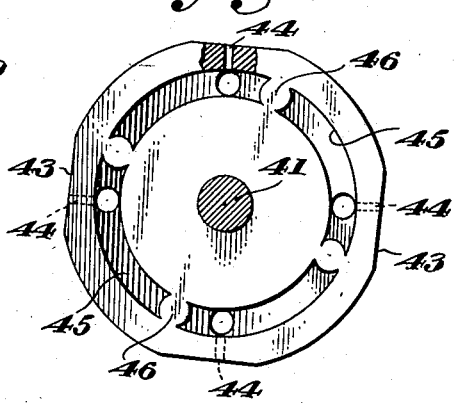
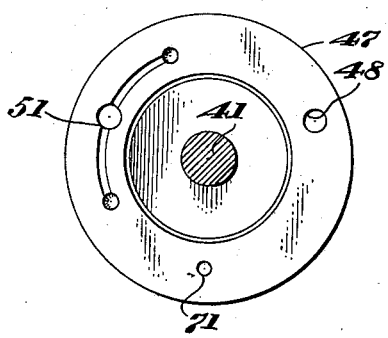
Inventor,
F. G. Cook
A. D. Adams
By　　　　Atty.

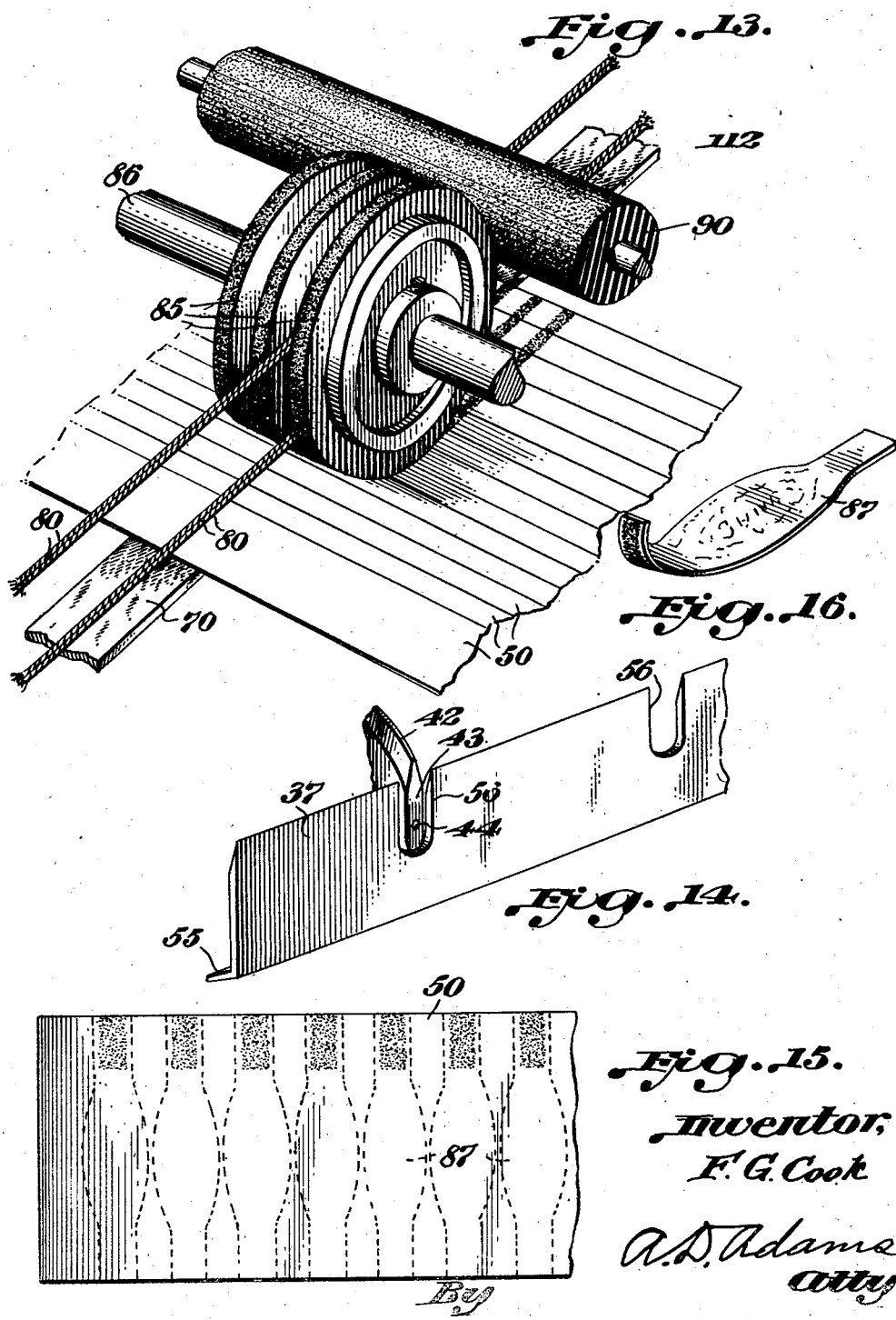

Patented May 29, 1945

2,377,295

UNITED STATES PATENT OFFICE 2,377,295

COMBINED PAPER FEEDING AND GUMMING MACHINE FOR LABELS AND THE LIKE

Frank G. Cook, Atlanta, Ga., assignor to Alexander Dittler, De Kalb County, Ga.

Application December 22, 1941, Serial No. 424,060

10 Claims. (Cl. 271—10)

This invention relates to a paper sheet feeding, arranging and treating machine, especially adapted for use in applying gum or adhesive to predetermined marginal areas of labels, sheets and the like. More particularly, the specific use of the machine is to apply glue to the tip portions of cigar bands, so that they can be cut out of a rectangular sheet ready to be applied to cigars. One of the main objects of the invention is to provide novel feeding means for rectangular sheets on which labels are to be or have been printed and conveyor mechanism for the fed sheets, so timed with respect to the feeding mechanism that the sheets are laid in predetermined, overlapped relation for treatment during the conveying operation. It is to be distinctly understood that the invention is not limited to use in applying adhesive, as it will be obvious that the overlapped portions of the sheets may be otherwise treated as by printing, moistening, etc. A further object of the invention is to provide an automatic machine of this type having a rotary, pneumatic sheet feeder adapted to pick up single sheets in succession from a magazine and deposit them individually on a conveyor in predetermined overlapped relation.

Another object of the invention is to provide a machine for handling sheets of material which comprises means for holding a stack of sheets substantially vertically on an edge thereof and means for removing the sheets successively from the stack and placing them on a substantially horizontal conveyor in an overlapping relation.

Other aims and advantages of the invention will appear in the specification, when considered in connection with the accompanying drawings, wherein:

Fig. 8 is a cross sectional view of one of the pneumatic sheet feeders taken on line 8—8 of Fig. 9;

Fig. 9 is an elevation of a portion of the sheet feeder;

Fig. 10 is an end view of the sheet feeder;

Fig. 11 is a sectional view of the sheet feeder showing the valve ports, taken on line 11—11 of Fig. 9;

Fig. 12 is a sectional view of a stationary valve member coacting with the feeder element of Fig. 11 and taken on line 12—12 of Fig. 9;

Fig. 13 is a fragmentary perspective view of the adhesive applying means;

Fig. 14 is a fragmentary perspective view of the detail of a bumper plate;

Fig. 15 is a plan view of a portion of one of the treated sheets;

Fig. 16 is a perspective view of a cut-out cigar band;

Fig. 17 is a fragmentary perspective view of a cord bolt guide; and

Fig. 18 is a cross sectional view of the detail of Fig. 17.

Referring particularly to the illustrated embodiment of the invention, the machine is shown as being designed to feed rectangular sheets on which a plurality of cigar bands are printed and apply adhesive to the back marginal faces of the sheets at one tip portion of each band so that the bands may subsequently be cut out, ready to be moistened and applied to cigars.

The machine is shown as having a supporting frame-work consisting of ordinary structural elements such as angle irons 19, a lower platform 20 carrying the operating units, an intermediate platform 21 on which the feeder and magazine is supported and a sheet receiving and treating table 22 on which the sheets are conveyed to be treated and subsequently dried.

Figure 7:
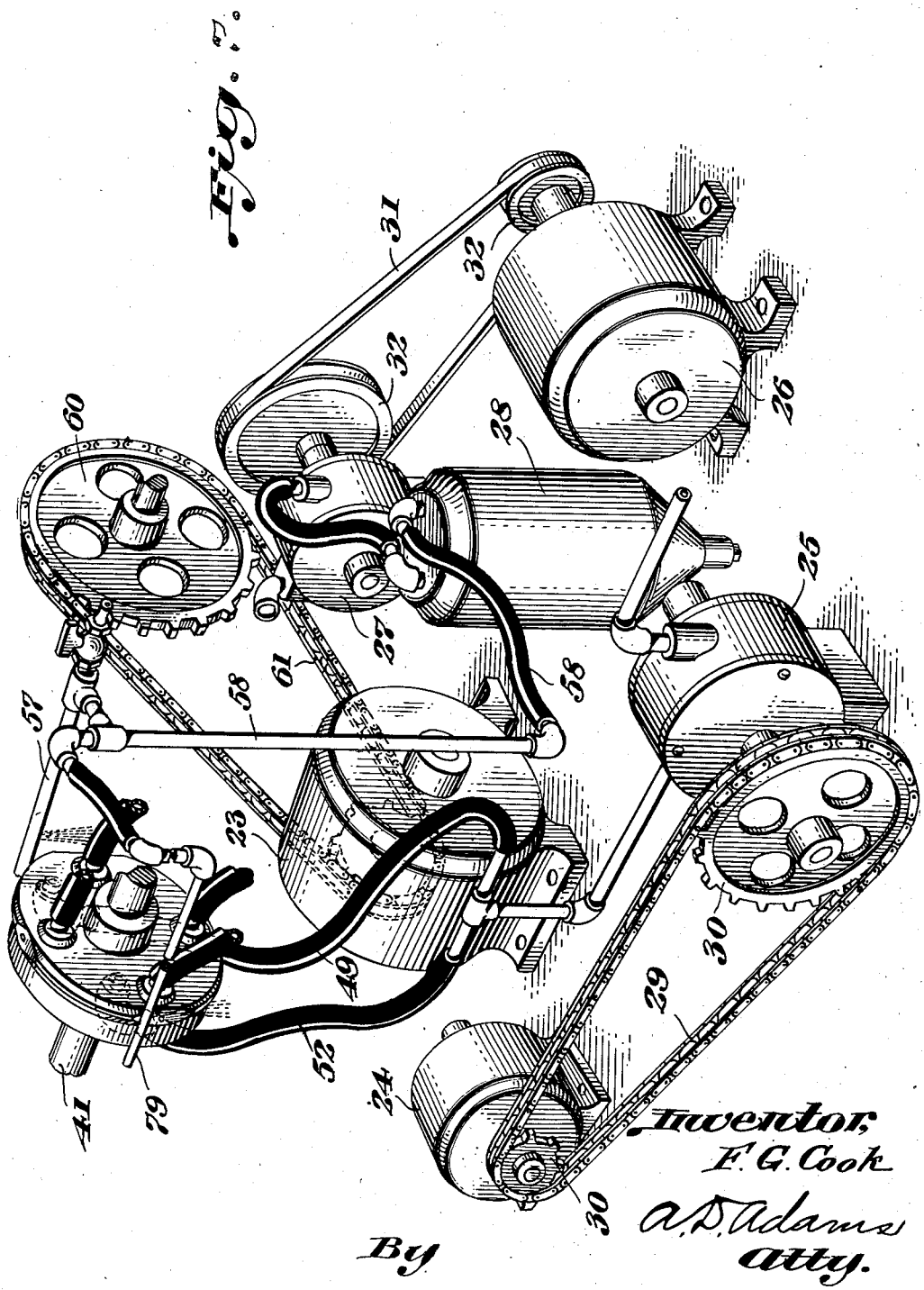
Fig. 7 is a perspective view of the drive mechanism and pneumatic system.

In this instance, the lower platform 20 carries the power and pneumatic units, best shown in Fig. 7, and including a main drive motor 23, a separate motor 24 for driving the vacuum pump 25 and a third motor 26 for driving an air compressor 27 which stores compressed air in an air tank 28. The motor 24 drives the vacuum pump 25 by means of a chain 29 and sprocket wheels 30; while the motor 26 is shown as driving the air compressor 27 by means of an ordinary belt 31 and pulleys 32.

Figure 3:
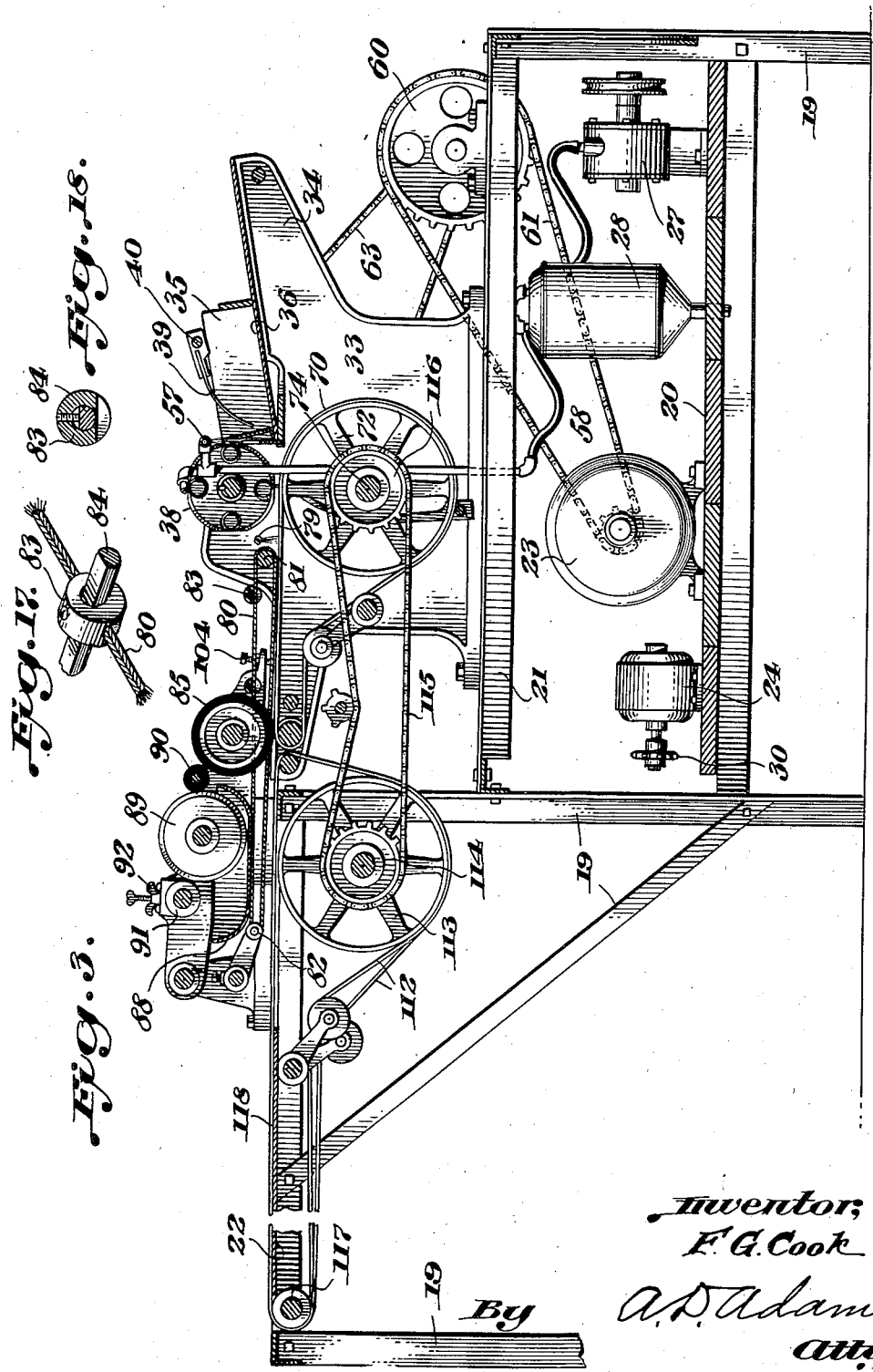
Fig. 3 is a longitudinal sectional view of the machine taken on the line 3—3 of Fig. 4.
Figure 4:
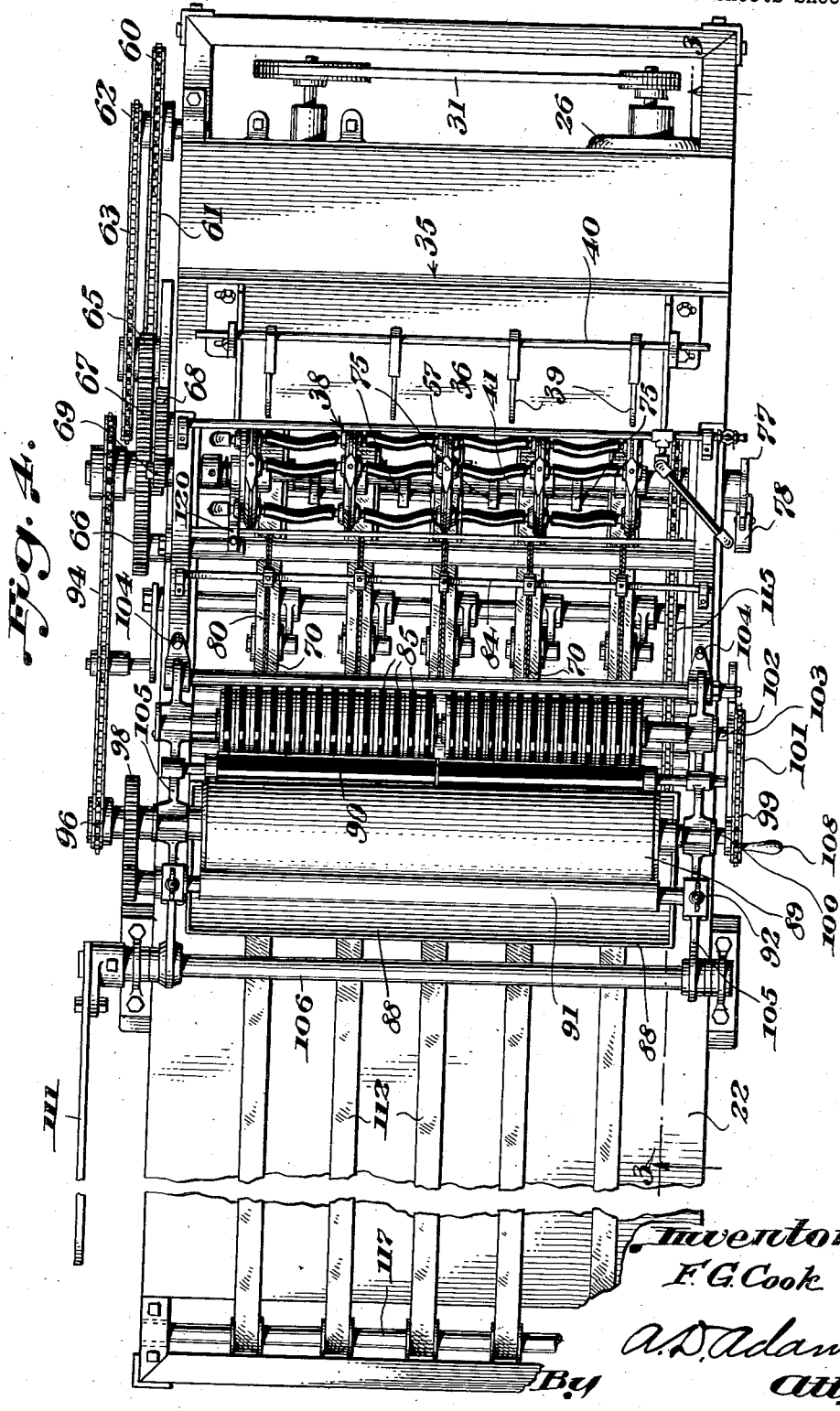
Fig. 4 is a top plan view of the machine.
Figure 6:
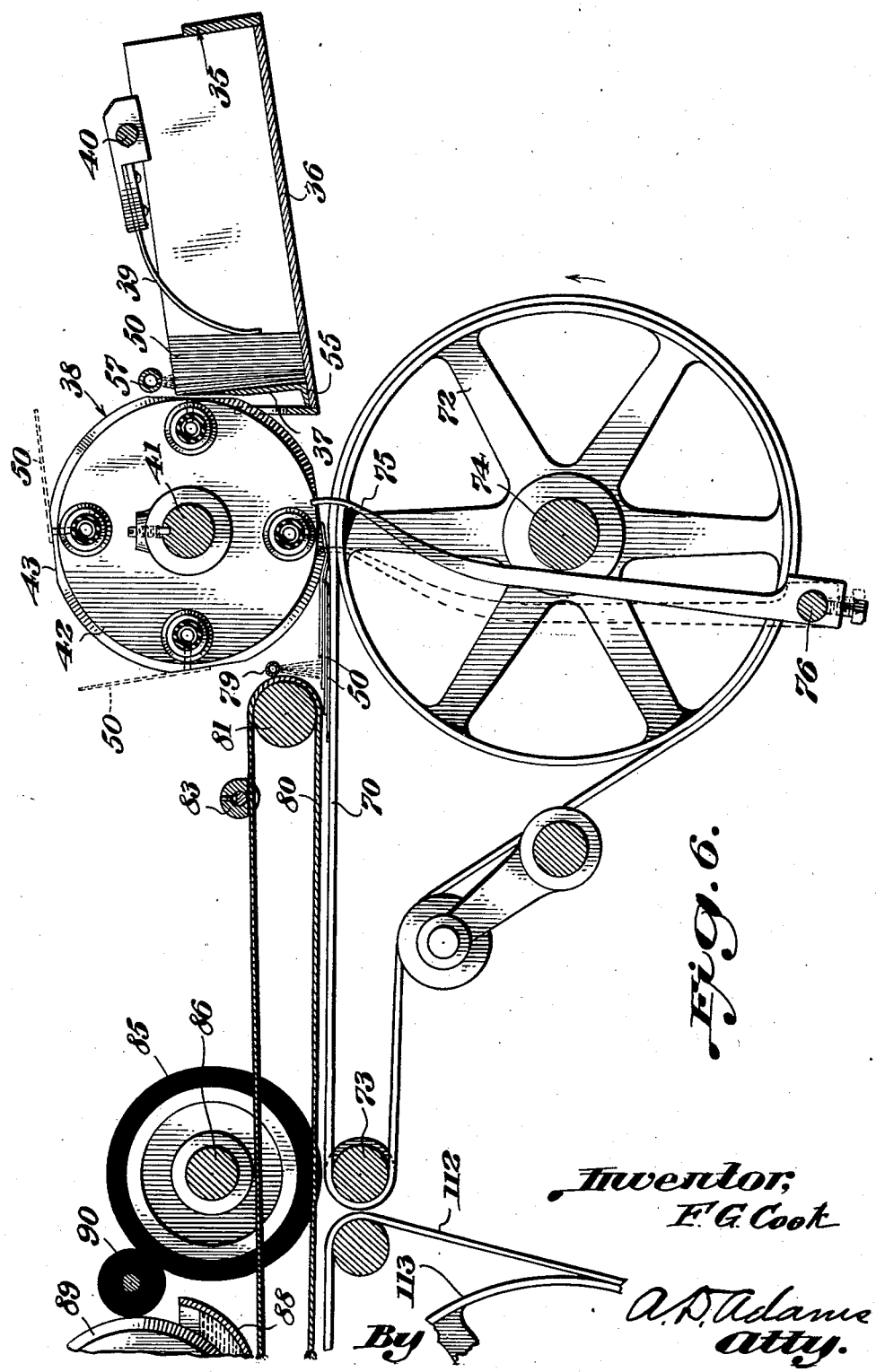
Fig. 6 is a vertical sectional view on an enlarged scale of the details of the sheet feeding, conveying and glue applying mechanisms.

The platform 21 carries side frame elements 33 having a forwardly projecting portion 34 on which is mounted a sheet feeding magazine 35 having an inclined bottom wall 36 (Figs. 3 and 6). This magazine 35 is shown as being in the form of a generally rectangular box or casing having a loosely mounted feeder or bumper plate 37 against which a stack of sheets, standing on edge in the magazine, are adapted to abut and be delivered to a rotary pneumatic feeder 36 in the form of a reel (Figs. 4, 6 and 9). The sheets are urged against the loosely mounted feeder 37 by means of a series of bent leaf springs 39 mounted on a transverse shaft 40 at the top of the magazine.

The pneumatic feeding mechanism comprises a shaft 41 journaled in the side frame members 33 and carrying a plurality of adjustably mounted discs 42, each provided with flat pick-up cam faces 43. A suction duct or opening 44 is provided in each pick-up face 43. These discs 42 are adjustable longitudinally on the shaft 41 to provide for picking up sheets of different lengths.

All of the suction openings 44 in the series of discs are connected to a common source of suction provided by the vacuum pump 25. In this instance, the end or right hand disc 42, shown in Fig. 9, constitutes a rotary valve which is especially designed to time the suction periods so that the sheets may be picked up edgewise from the magazine, then held on the rotating discs and the suction released to release the sheets at the proper time on a conveyor, later to be described. This particular valve disc is shown in Fig. 11 as having an annular channel 45 separated into quadrants, there being four pick-up openings 44 provided in each disc 42. The channel is divided into quadrants by means of suitable valve plugs or webs 46.

The quadrants of the annular channel 45 (Fig. 11) cooperate with a stationary valve member in the form of a plate or disc 47 (Fig. 12) having a suction opening 48 on the side adjacent to the magazine and connected to the suction pump 25 by a hose 49. The arrangement of this port is such that when a valve plug 46, separating the quadrants in the rotating valve disc, passes the port 48, suction will be applied to the suction openings 44 in the flat faces 43 of the discs and pick up a sheet of paper 50 from the magazine engaging it near the upper edge. The stationary plate 47 also has an arcuate channel 51 around about a fourth of its circumference and spaced from the port 48, also about a fourth of the circumference of the plate. This arcuate channel 51 also communicates with the suction pump 25 by means of a second hose 52 connected to the channel. Now, when the leading plug 46 of the channel 45 which has sucked on a sheet, passes the leading end of the arcuate channel, the suction will be applied to the sheet through the arcuate channel 51 during about a half revolution of the disc 42 or until the sheet of paper is ready to be released from the rotary feeder 38. Then the next suction quadrant of the channel communicates with the suction port 48 to pick up another sheet. The other discs 42 constituting the rotary feeder simply have suction openings which have passages extending through their sides. These passages are provided with lateral nipples 53 and corresponding suction openings on the respective discs are connected to the source of suction by means of flexible hose sections 54 slipped over the nipples.

Referring again to the magazine 36, the stack of sheets 50, which are inserted edgewise therein, must be separated to permit only one sheet at a time to be picked up by the rotary feeder 38. Every time the flat faces 43 of the discs come in contact with the upper marginal edge portions of the stack of sheets, a single sheet is picked up and carried upwardly and around the feeder 38. The flat faces serve as a cam bumper to shake the sheets in the magazine, by permitting the loosely mounted plate 37 to rock rearwardly or toward the feeder. It has a foot portion or flange 55 resting on the bottom wall 36 of the magazine. Also, it is shown in Fig. 14 as having a series of vertical slots 56 through which the peripheral edges of the rotating discs 42 are adapted to project. A series of air jets are discharged downwardly against the upper edges of the sheets 50 adjacent to the periphery of the discs 42 through a transverse pipe 57 connected to the compressed air tank 26 by means of a conduit 58. The pipe 57 is preferably perforated on its lower side to discharge the jets of air properly against the upper edges of the sheets.

Figure 5:
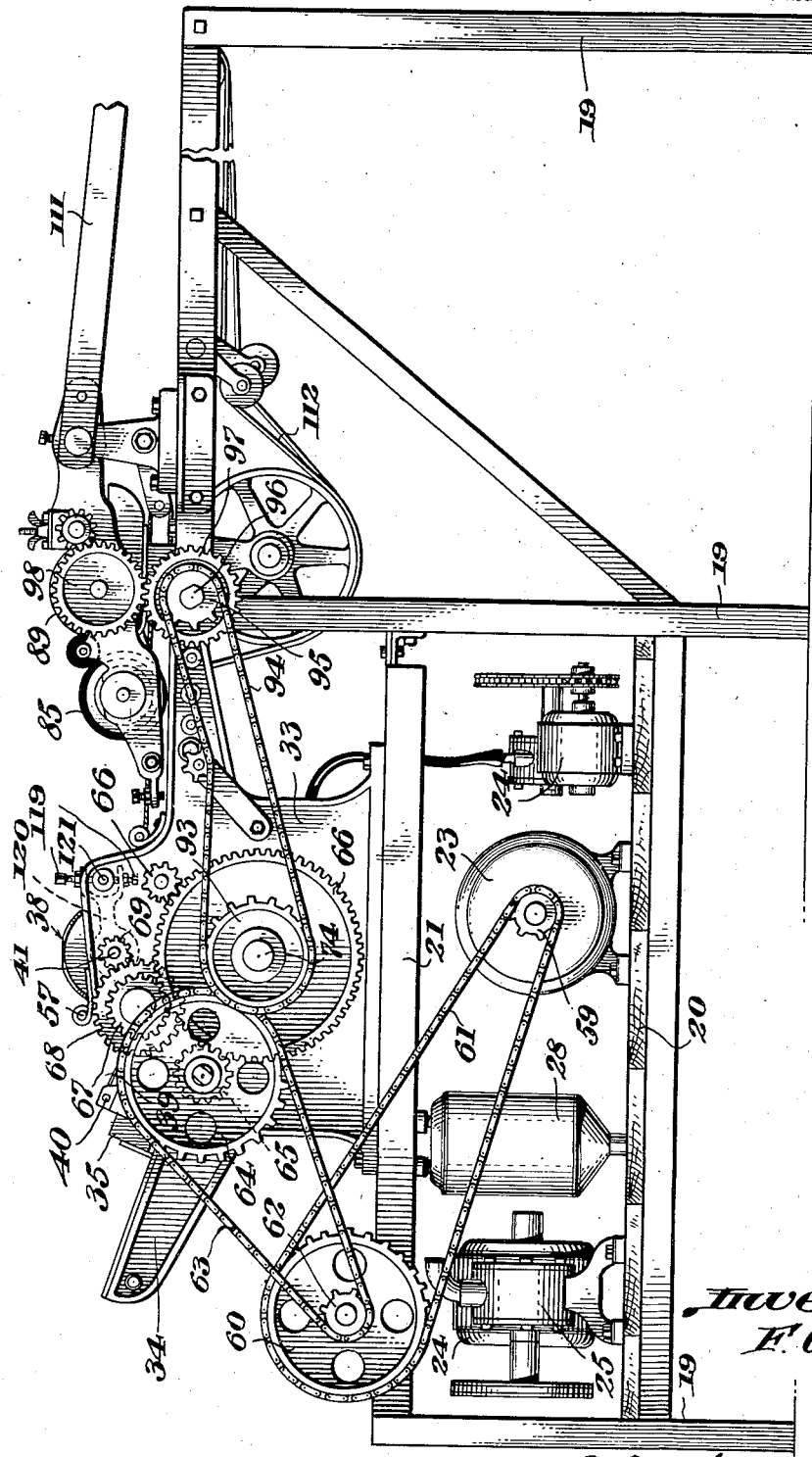
Fig. 5 is a side elevation of the machine showing the side opposite to that of Fig. 1.

The rotary feeder 38 is shown as being driven by the driving motor 23 through suitable reduction gears. In Fig. 5, the motor 23 is shown as having a sprocket wheel 59 on its shaft which drives an idler sprocket wheel 60, mounted on the frame, by means of a sprocket chain 61. The idler sprocket 60 drives a small sprocket 62 which is connected by a chain 63 to a large sprocket wheel 64 carrying a pinion 65 meshing with a large gear 66 which, in turn, meshes with a gear 67 carrying a still larger gear 68 and this gear 68 meshes with a small gear 69 on the feeder shaft 41.

Referring to Fig. 6, the feeder 38 is there shown as having picked up sheets 50 and transferred them to conveyor belts 70. It will be recalled that the sheets picked up from the magazine are carried around by the feeder through approximately three-fourths of a revolution from the pick-up station to the releasing station due to the arrangement of the cooperating valve parts associated with the end disc. In Fig. 6, a sheet is about to be released from the flat portions 43 of the feeder discs 42 at the bottom. At this point, the suction on the paper sheet is released. For that purpose, the stationary disc 47 (Figs. 10 and 12), is shown as having a vent opening or port 71 which registers with the respective quadrants of the channel 45 and establishes atmospheric pressure therein. Then the sheet drops by gravity and is deposited flatly on the conveyor belts 70.

The conveyor belts are shown as being trained on pulleys 72 and a roller 73, the pulleys 72 being mounted on a shaft 74 which is driven by the gear 66, the ratio of the speed of the conveyor belt and the feeder being determined by the particular gear ratio which controls the amount of overlap of the individual sheets.

Figure 1:
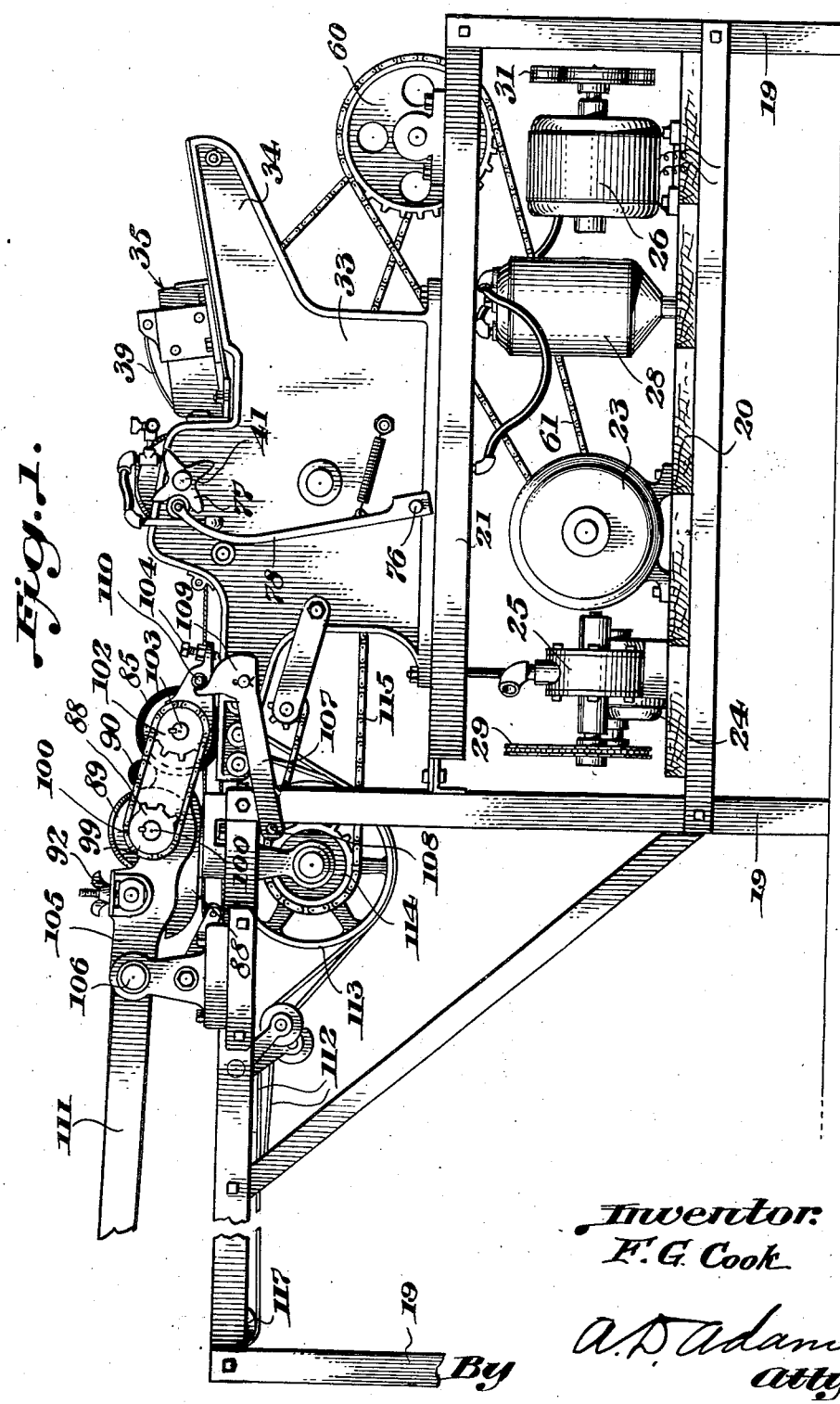
Fig. 1 is a side elevation of the machine.
Figure 2:
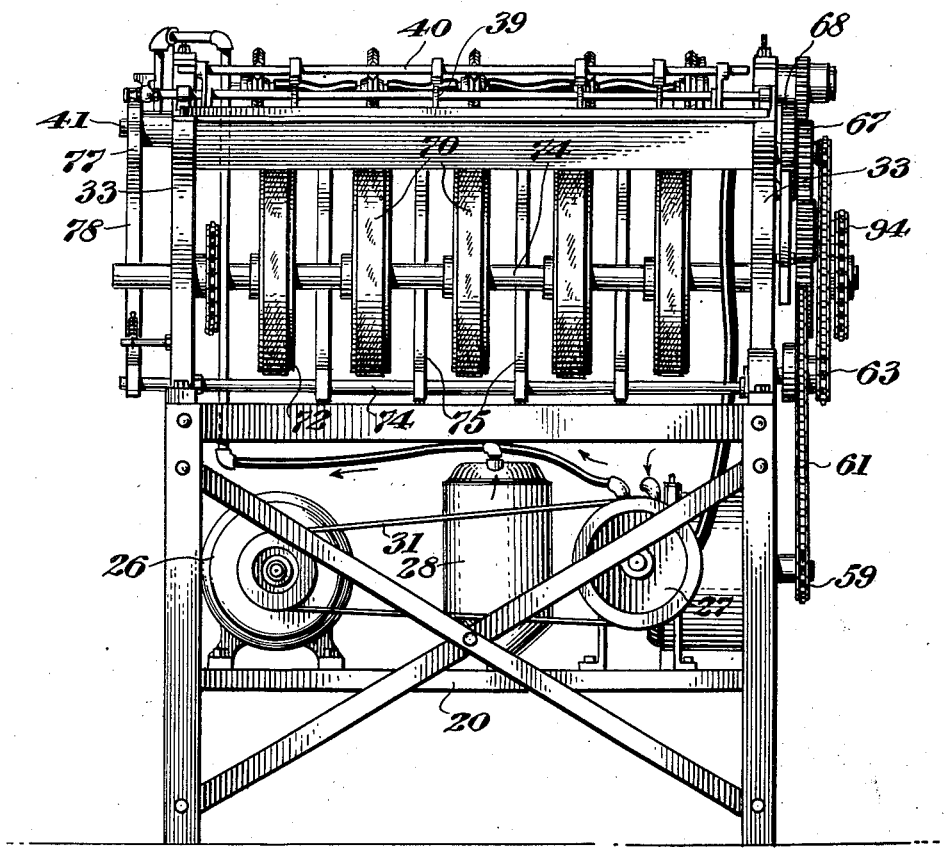
Fig. 2 is an end elevation of the front of the machine.

It will be seen from Figs. 6 and 13 that the sheets 50 are deposited on the conveyor belts 70 in overlapped relation. The exposed marginal edges are adapted to be treated with stripes of glue or adhesive when the sheets are printed to provide cigar bands and the like. Each released sheet is overlapped on the next adjacent one slightly less than is required. It is adapted to be moved edgewise on the conveyor belt to the proper overlapped position with its edges parallel to the edges of the next sheet by means of upstanding kicker fingers or arms 75 on a rocker shaft 76, which is shown as being driven in proper timed relation to the feeder by a multiple cam 77 (Fig. 1) on the shaft 41 and acting on a spring urged operating arm 78 on one side of the machine.

The kicker fingers 75 will straighten out any sheets that may be somewhat twisted on the flat faces of the feeder discs. After the overlapped sheets 50 are thus deposited or released on the conveyor belts, a series of jets of air are directed downwardly on them by means of a perforated pipe 79 (Fig. 6) also communicating with the compressed air tank 28 (Fig. 7). This holds down the sheets on the belts 70 until they are engaged by a series of cord belts 80 trained over drums 81 and 82 (Fig. 3) and guided in proper spaced relation by means of slotted guide members 83 adjustably mounted on a transverse shaft 84 (Figs. 17 and 18). The cord belts 80 are shown as being arranged in pairs better to engage the exposed faces of the overlapped sheets and the sheets are thus conveyed to a series of adhesive applying rollers or discs 85 adjustably mounted on a transverse shaft 86. The glue applying discs or rollers 85 are separated or spaced to correspond with the separation of printed individual bands 87 (Fig. 15) on the sheets 50, all of the printed portions being exactly aligned when deposited on the conveyor belts. Referring to Fig. 13, it will be seen that the glue applying discs apply streaks or stripes of glue to the overlapped sheets in the manner clearly shown in Fig. 15. It is only necessary to apply the glue to one tip of each band and the amount of overlap determines the length of the tip portion to which the glue can be applied.

It will be understood that the glue may be delivered to the glue rolls or discs in any approved manner. In this instance, the machine is shown as having a removable glue pot 88 (Fig. 3) supported on opposite sides of the frame. A glue pick-up roll 89 is arranged in the pot and transfers glue to a doctor roll 90 loosely and freely rotatable between the roll 89 and the discs 85. A wiper roll 91 adjusted by wing nuts 92 determines the thickness of the film of glue on the roll 89 to be transferred to the discs 85. The glue roll 89 is connected to be driven by a sprocket wheel 93 (Fig. 5) on the shaft 74 and a chain 94 which drives a sprocket wheel 95 on a shaft 96 which carries a gear 97 meshing with a gear 98 on the shaft of the roll 89. The glue applying discs 85 are driven by a sprocket wheel 99 (Fig. 4) on the shaft 100 of the glue pot roll 89 through a chain 101 driving a sprocket 102 on the shaft 103 which carries the glue applying discs 85.

The glue applying discs are adapted to be adjusted up and down by means of a pair of set screws 104 (Figs. 1 and 4) at the forward end of a frame 105 which carries all of the rolls and which is pivotally mounted on a shaft 106 at its rear end. It is necessary to adjust the height of the discs with reference to the overlapped sheets so that the discs will not deposit glue on the conveyor belts 70 after the overlapped sheets have passed over them. Also, it is desirable to lift the glue applying discs 85 above the sheets when they are disarranged. For this purpose, there is shown a cam lever 107 (Fig. 1), at one side of the machine having a handle 108 and a cam face 109 engaging a roller 110 near the forward end of the frame 105. To enable the glue pot to be removed and cleaned, there is shown an elongated hand lever 111 extending rearwardly at one side of the machine (Fig. 4) to operate the shaft 106 to lift up all the rolls. The weight of this lever also tends to counterbalance the weight of the rolls.

After the glue is applied in stripes to the sheets, they are transferred by the belts 70 to delivery belts 112 on pulleys 113 (Fig. 3), driven by a sprocket wheel 116 on the shaft 74. These belts 112 are trained over a drum 117 at the rear end of the table 22. Incidentally, the upper runs of the belts 112 ride on a top plate 118 of the table and the length of the table may be sufficient to permit the glue to air dry before the sheets reach the end of the table; although it is contemplated that the glue may be dried by the application of heat (not shown), in which case the length of the table may be shortened.

To enable the machine to operate efficiently on sheets of different widths, it is desirable to adjust the points of pick-up so that the suction is always effective near the upper margins of the upstanding sheets. To this end, the stationary valve disc or plate 47 is adjustable by means of opposed set screws 119 (Fig. 10) on a forked arm 120 which is connected to the plate. The opposed set screws 119 act on a fixed stub member 121 on one of the machine frame elements 33 (Figs. 4 and 5).

If it is desired to change the amount of overlap of the sheets, it is obvious that the speed of the conveyor belts must be changed accordingly. While this may be accomplished by an ordinary variable speed gear (not shown), it is preferably done by changing the size of the gears 66 and 67 or substituting gears of the proper ratio for them.

To operate the machine, an operator places a stack of sheets in the magazine 36 against the bumper plate 37 and then starts the motors 23, 24 and 26 by means of suitable switches, not shown. This causes rotation of the feeder and a partial separation of a number of the sheets nearest the bumper plate by means of air blasts from the pipe 57. The discs 42 of the feeder pick up successive partially separated sheets by suction and the individual sheets 50 are carried around in a circumferential path of approximately 270° until the sheets are just above the conveyor belts 70, at which point the suction on the sheets is released due to the valve action, hereinbefore described. Just at this suction release station, the kicker fingers 75 become operative to adjust and move the individual sheets on the belts 70 so that the overlapped, exposed edge portions of the sheets will be uniform. The conveyor belts next carry the sheets under the air stream from pipe 79 to keep them flat until they move under the gripping cord belts 80. Then, the sheets are conveyed under the adhesive applying rollers 85 to apply stripes of adhesive or a small area of adhesive on the tip of each label of which a plurality are printed on each sheet. The sheets are next transferred on another series of belts 112 which finally travel over a table 22 and on which the adhesive dries before the sheets are again stacked ready for the labels to be cut or punched out of the sheets.

The discs 42 of the feeder 38 may be axially adjusted relative to each other as well as each of them being adjustable in a rotational relationship. For this reason, the suction tubes 54 are flexible. If too much slack is present in these tubes a wire, cord or coiled spring (not shown) may be fastened to or around these tubes so that they will not swing outwardly due to centrifugal force so as not to interfere with the picked up sheets. The axial adjustment of the discs 42 is for the purpose of coordinating them with different lengths of sheets. Also, if for instance, the valve plate 47 is adjusted counterclockwise (Fig. 10), the pick-up points will be lowered for narrower sheets.

It will be apparent from the foregoing that an important feature of applicant's invention resides in the various means automatically operative for arranging a series of sheets on a conveyor fed from a stack of sheets standing on their edges, so that the sheets will be arranged on the conveyor in an overlapping relationship to apply stripes of adhesive to the exposed portions of the sheets on the conveyor. In the example of the machine illustrated, the machine applies adhesive to cigar bands, but of course, any other types of labels may be treated and also the machine may arrange any other type of sheets for any desired purpose.

Obviously, the present invention is not restricted to the particular embodiment herein shown and described. Moreover, it is not indispensable that all the features of this invention be used conjointly, since they may be employed advantageously in various combinations and subcombinations.

What is claimed is:

1. In a machine for treating substantially rectangular sheets of paper, a magazine supporting the sheets substantially upright on one side edge; a rotary suction feeder adjacent to the magazine arranged to pick up the sheets in succession from the magazine by engaging their upper marginal face portions next to the feeder; an endless conveyor arranged below the feeder to receive the picked-up sheets in succession and driven in timed relation to the feeder to provide for overlapping the sheets; means to release the suction on the sheets as they reach the conveyor; and kicker means also below the feeder and operated in timed relation to the released sheets to kick the sheets edgewise on the conveyor with their overlapped, exposed edges parallel with each other.

2. In a machine for treating substantially rectangular sheets of paper, a magazine supporting the sheets substantially upright on one side edge; a rotary suction feeder adjacent to the magazine arranged to pick up the sheets in succession from the magazine by engaging their upper marginal face portions next to the feeder; a bumper plate in the magazine adjacent to the feeder; means on the feeder engaging the bumper to jog the sheets when they are picked up; means for directing an air jet downwardly on the upper edges of a few sheets which are about to be fed to separate the upper portions of said sheets; an endless conveyor arranged below the feeder to receive the picked-up sheets in succession and driven in timed relation to the feeder to provide for overlapping the sheets; and means to release the suction on the sheets as they reach the conveyor.

3. A machine for treating marginal back face portions of rectangular sheets, each bearing a plurality of labels on its front face, comprising a magazine supporting a stack of the sheets on one side edge and having a movable bumper plate at one side of the stack; a rotary suction feeder adjacent to the bumper plate having perforate pick-up faces coacting with the bumper plate to jog the sheets and pick them up in succession by their upper back faces; valve means to release the suction on the sheets at a releasing station with their back faces up; an endless conveyor under the feeder to receive the released sheets and timed to provide the desired overlap of the sheets; and kicker means also timed to kick the released sheets on the conveyor with their edges parallel.

4. A machine for treating marginal back face portions of rectangular sheets, each bearing a plurality of labels on its front face, comprising a magazine supporting a stack of the sheets on one side edge and having a movable bumper plate at one side of the stack; a rotary suction feeder adjacent to the bumper plate having perforate pick-up faces coacting with the bumper plate to jog the sheets and pick them up in succession by their upper back faces; pneumatic means for discharging jets of compressed air downwardly on the upper edges of those sheets next to the bumper plate to assist in their individual withdrawal from the feeder; valve means to release the suction on the sheets at a releasing station with their back faces up; and endless conveyor under the feeder to receive the released sheets and timed to provide the desired overlap of the sheets; and kicker means also timed to kick the released sheets on the conveyor with their edges parallel.

5. A machine for treating marginal back face portions of rectangular sheets, each bearing a plurality of labels on its front face, comprising a magazine supporting a stack of the sheets on one side edge and having a movable bumper plate at one side of the stack; a rotary suction feeder adjacent to the bumper plate having perforate pick-up faces coacting with the bumper plate to jog the sheets and pick them up in succession by their upper back faces; pneumatic means for discharging jets of compressed air downwardly on the upper edges of those sheets next to the bumper plate to assist in their individual withdrawal by the feeder; valve means to release the suction on the sheets at a releasing station with their back faces up; an endless conveyor under the feeder to receive the released sheets and timed to provide the desired overlap of the sheets; kicker means also timed to kick the released sheets on the conveyor with their edges parallel; pneumatic means for discharging compressed air jets downwardly on the kicked sheets to hold them on the conveyor; and upper gripping belts engaging the overlapped sheets held down by the air jets.

6. In a machine of the character described having a magazine for holding a plurality of rectangular sheets on edge, pick-up and feeding means for the sheets comprising a plurality of spaced rotary disc members adjustably mounted on a shaft and having horizontally aligned flat portions with a perforation in each flat portion through which suction is adapted to be communicated to the upper edge portion of each sheet; a fixed valve member coacting with one of the rotary members near one end of the shaft; valve means in said last named rotary member coacting with said fixed valve member; pneumatic conduits connected to the fixed valve member and arranged between the disc members, whereby suction may be transmitted to all of the aligned pick-up perforations; and means to adjust the fixed valve member to vary the height of the pick-up points relative to the sheets, said fixed valve member having a vent port to release the suction on the pick-up sheets at a delivery station.

7. In a machine for treating paper sheets and the like, a casing for holding a plurality of sheets substantially vertically on one edge and having means for urging the sheets to one side of the casing; means operative on the side of the casing against which the sheets are urged to remove the sheets successively, one at a time; a conveyor extending under and near the sheet removing means; means for moving the conveyor; means in the sheet removing means for releasing the sheets on the moving conveyor when the sheets reach the conveyor in overlapping relation; and means for arranging the sheets on the conveyor operative when the sheets are released by the sheet removing means to provide a uniform overlap of all the sheets on the conveyor.

8. In a machine for treating paper sheets and the like, a casing for holding a plurality of sheets substantially vertically on one edge and having means for urging the sheets to one side of the casing and means to separate the upper portions of a number of sheets adjacent the side of the casing against which the sheets are urged; means operative on the side of the casing against which the sheets are urged to remove the sheets successively, one at a time; a conveyor extending under and near the sheet removing means; means for moving the conveyor; means in the sheet removing means for releasing the sheets on the moving conveyor when the sheets reach the conveyor in overlapping relation; and means for arranging the sheets on the conveyor operative when the sheets are released by the sheet removing means to provide a uniform overlap of all the sheets on the conveyor.

9. A machine for applying adhesive to rectangular sheets of paper on which a plurality of labels are printed, comprising in combination, a magazine in which a stack of the sheets are supported edgewise; a horizontal, rotary, suction feeder adjacent to one side of the magazine arranged to pick up the sheets, one at a time, by the upper margins of their back faces; rotary valve means operated by the feeder to cut off the section and release the sheets with their back faces up; kicker arms operated by the machine engaging the rear edges of the sheets to disengage them from the feeder; and an endless conveyor for receiving the sheets and operated in timed relation to the feeder so that the released sheets are deposited thereon in overlapped relation with exposed marginal faces.

10. A machine for applying adhesive to rectangular sheets of paper on which a plurality of labels are printed, comprising in combination, a magazine in which a stack of the sheets are supported edgewise; a horizontal, rotary, suction feeder adjacent to one side of the magazine arranged to pick up the sheets, one at a time, by the upper margins of their back faces; rotary valve means operated by the feeder to cut off the suction and release the sheets with their back faces up; mechanical kicker means connected to push the released sheets away from the feeder, and an endless conveyor for receiving the sheets and operated in timed relation to the feeder so that the released sheets are deposited thereon in overlapped relation with exposed marginal faces of substantially uniform width.

FRANK G. COOK.